July 1, 1930.  W. J. MILLER  1,769,530
APPARATUS FOR FEEDING AND FORMING PLASTIC
MATERIAL IN THE MANUFACTURE OF POTTERY
Filed March 14, 1927  4 Sheets-Sheet 3
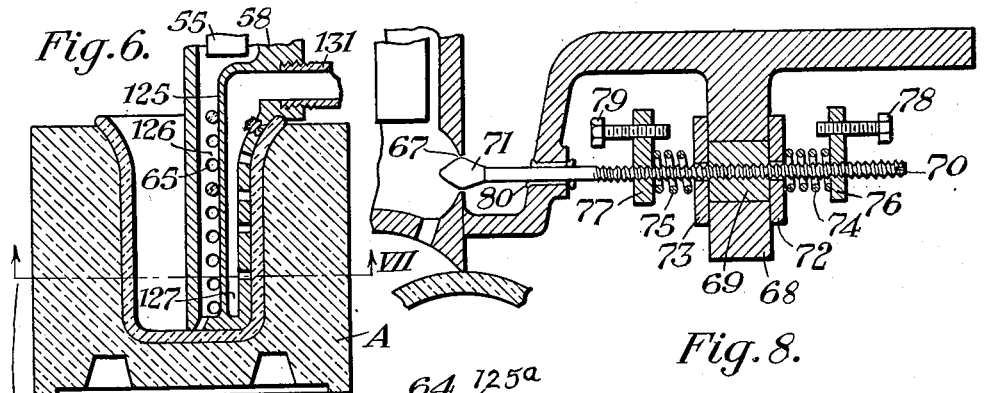
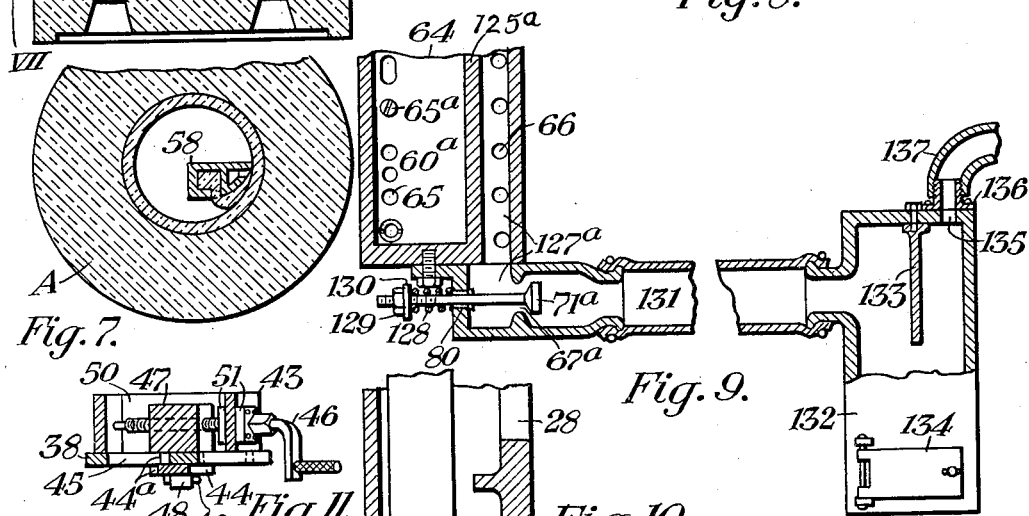
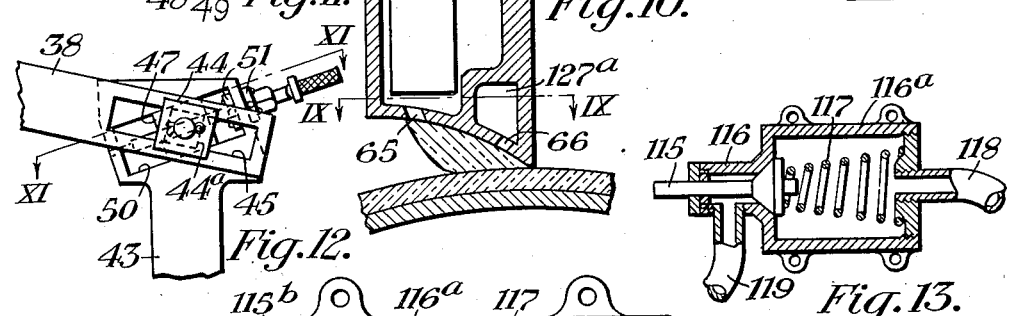
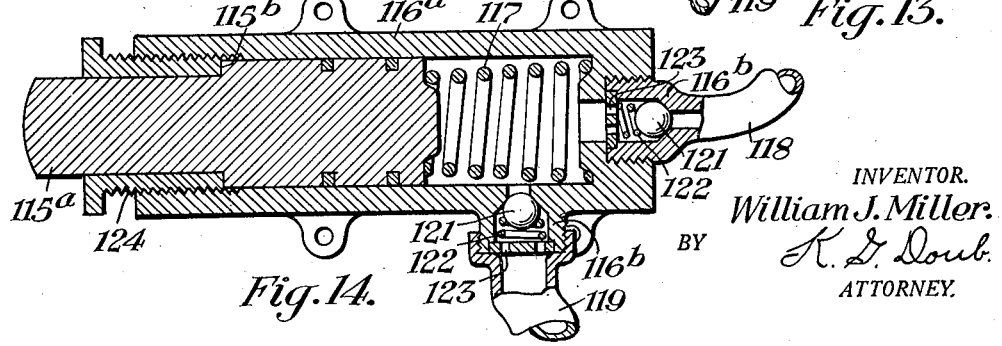
INVENTOR.
William J. Miller.
BY
ATTORNEY.

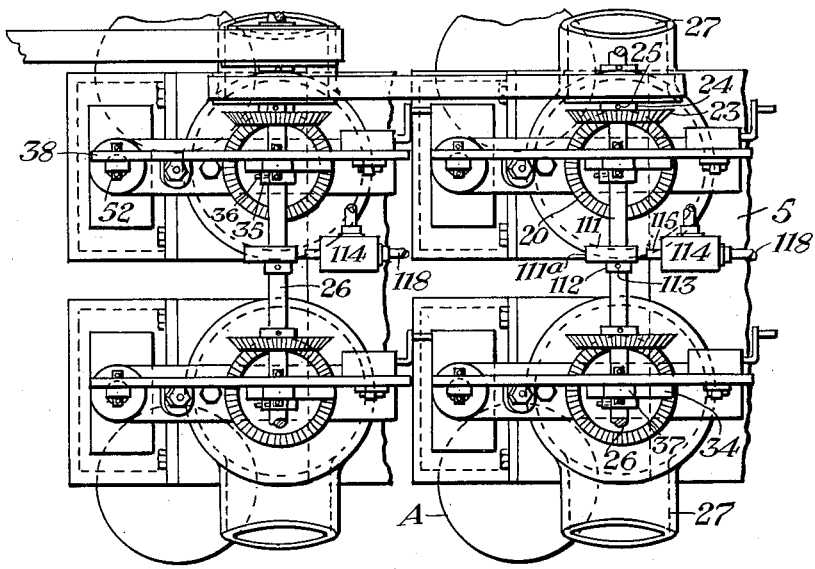
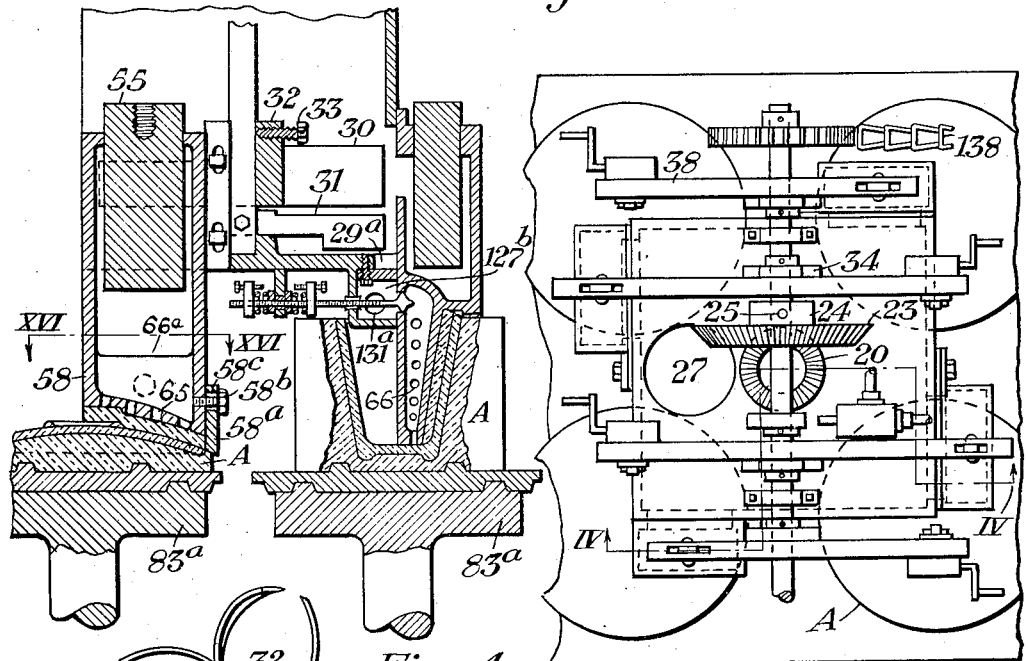
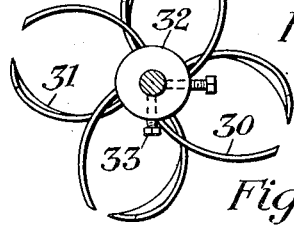

July 1, 1930.  W. J. MILLER  1,769,530
APPARATUS FOR FEEDING AND FORMING PLASTIC
MATERIAL IN THE MANUFACTURE OF POTTERY
Filed March 14, 1927   4 Sheets-Sheet 4
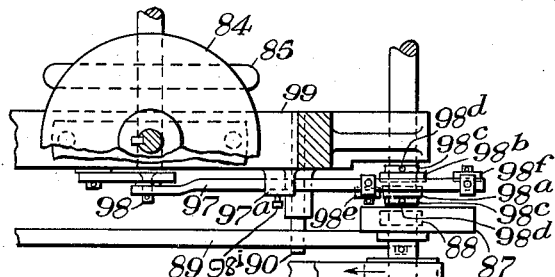
Fig. 15.
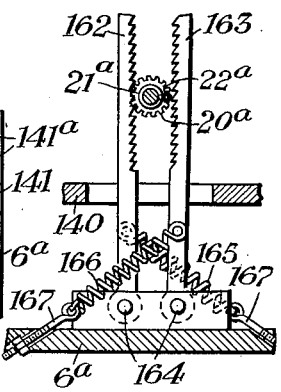
Fig. 16.
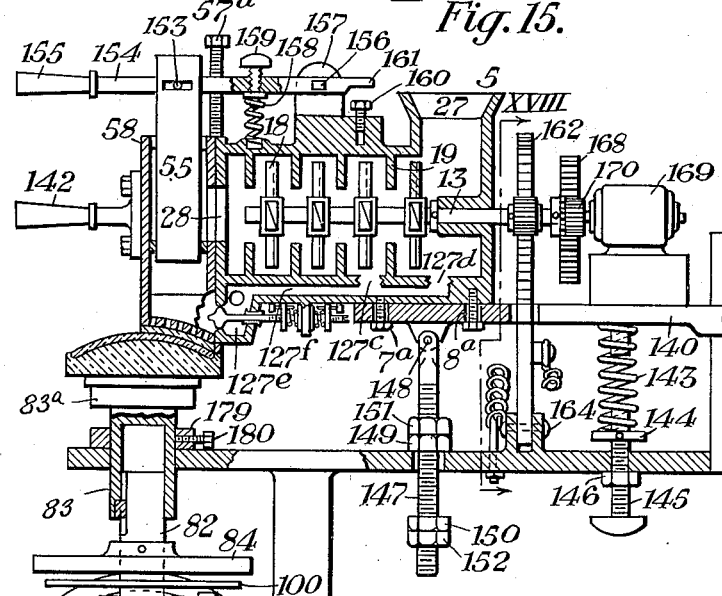
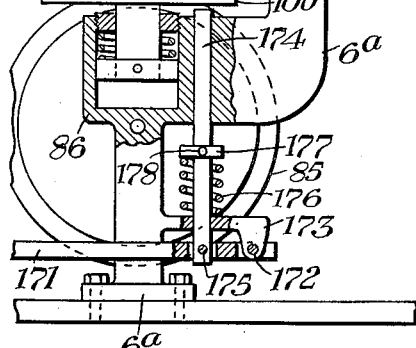
Fig. 18.
Fig. 17.
INVENTOR.
William J. Miller.
BY
ATTORNEY.

Patented July 1, 1930

1,769,530

UNITED STATES PATENT OFFICE

WILLIAM J. MILLER, OF SWISSVALE, PENNSYLVANIA

APPARATUS FOR FEEDING AND FORMING PLASTIC MATERIAL IN THE MANUFACTURE OF POTTERY

Application filed March 14, 1927. Serial No. 175,341.

This invention relates to an improved method and means for feeding plastic material to molds in the manufacture of pottery.

Broadly, the present invention provides means whereby the plastic material may be progressed through a main container into a chambered profile, or preforming and final forming member, and extruded through the latter directly into or on a rotating mold in measured charges, and jiggered, means being also provided for taking off any excess material during the jiggering operation and conveying it to a separate container to be reconditioned, and/or for drawing the excess material back into the chambered profile and/or main container to be mixed with the plastic material therein and again extruded with further charges.

An essential object of the invention, therefore, is to provide means for automatically extruding measured charges of plastic material directly into or on a mold through the means for forming the charge.

Another object of the invention is to provide means whereby charges of plastic material may be applied to molds by a process of extrusion and extraction.

Another object of the invention is to provide means whereby a charge of plastic material may be extruded directly into or on a mold in the form of what may be considered a spiral-like layer, and jiggered, or preformed and finally formed in one operation.

Another object of the invention is to provide means whereby a charge of plastic material may be extruded through a profile member directly into or on a mold and jiggered, and any excess of material automatically removed from the charge during the jiggering operation and conveyed back to and mixed with the material to be subsequently extruded in further charges.

A further object of the invention is to generally simplify and improve mechanism for feeding plastic material to molds, and to dispense with separate profile and other instrumentalities commonly used in the manufacture of pottery.

Still further objects are, to apply the clay in selective volume to various parts of the mold as required for the particular article of pottery being manufactured; to feed a plurality of molds of different kinds from one container; to remove excess clay through the application of sub-atmosphere, and to automatically control the removal of excess clay as well as extrusion of the clay.

Other objects and advantageous features and adjustments will become apparent as the description develops in connection with the drawings, wherein:—

Fig. 2 is a top plan view, illustrating a preferred manner of connecting a multiple of units in series and parallel.

Fig. 3 is a similar view of a multiple of units mounted to operate with one container.

Fig. 4 is a section on the line IV—IV Fig. 3, of the lower part of the structure.

Fig. 5 is a detail plan view of one of the parts.

Fig. 6 is an enlarged transverse vertical section through a deep mold and preferred form of profile member adapted therefor.

Fig. 7 is a horizontal section on the line VII—VII, Fig. 6.

Fig. 8 is an enlarged detail view in section and side elevation of a regulating valve structure.

Fig. 9 is a section taken on the line IX—IX, Fig. 10, of a modified form of regulating valve and means for removing excess clay.

Fig. 10 is a transverse vertical section through the profile member partly shown in Fig. 9.

Fig. 11 is a detail sectional view of an adjusting means taken on the line XI—XI, Fig. 12.

Fig. 12 is a similar view in side elevation.

Fig. 13 is a detail sectional view of a fluid valve.

Fig. 14 is a similar view of a pump structure.

Fig. 15 is a horizontal section taken on the line XV—XV, Fig. 1.

Fig. 16 is a similar view taken on the line XVI—XVI, Fig. 4.

Fig. 17 is a view in section and side elevation, and partly broken away, of a modification in structure to adapt the mechanism for manual operation.

Fig. 18 is a view of a ratchet structure taken on the line XVIII—XVIII, Fig. 17.

Figure 1:
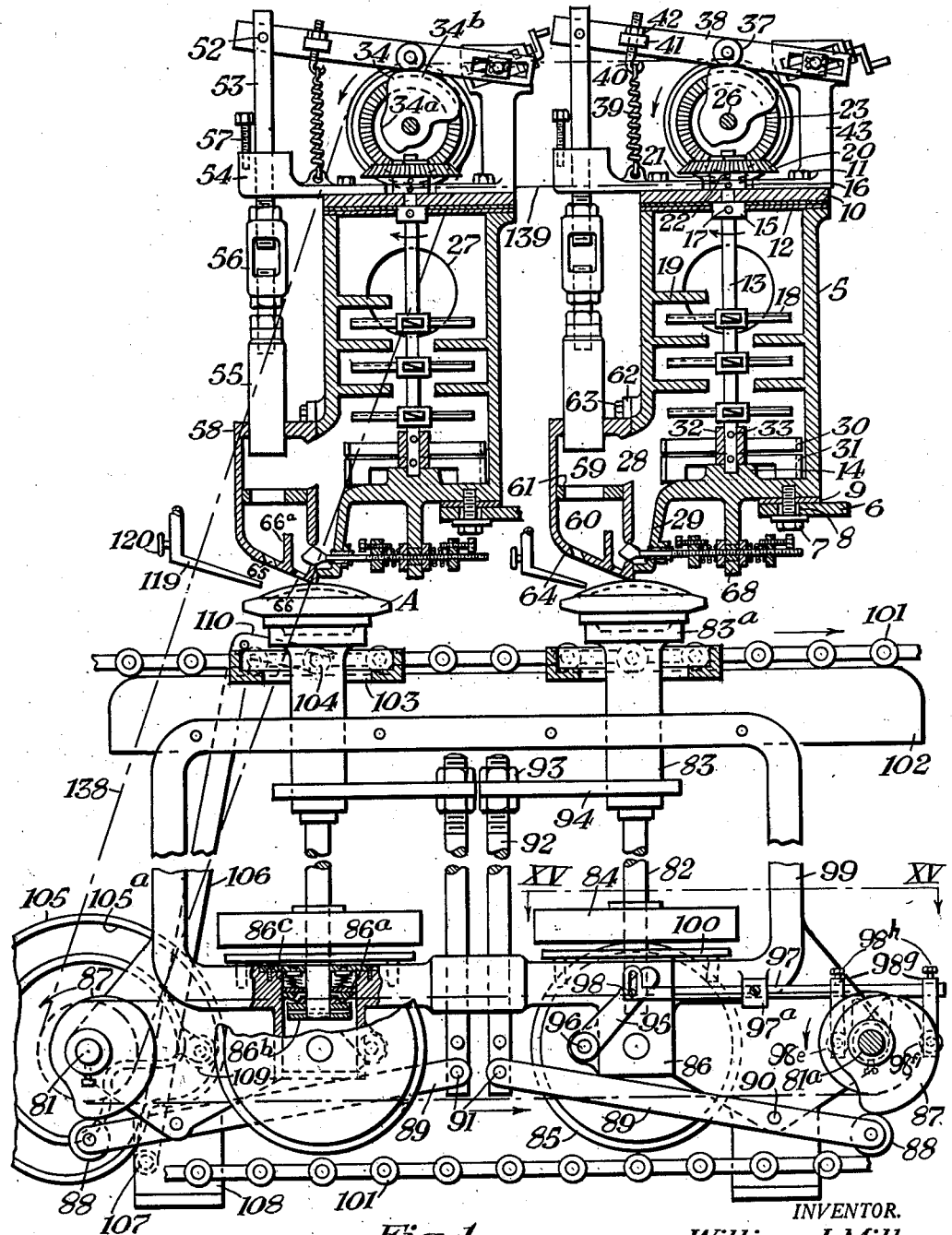
Fig. 1 is a side elevation, partly in section and broken away, of mechanism embodying the features of my invention.

The improved feeder herein disclosed is particularly adapted for use in connection with jiggering mechanism of the type disclosed in my co-pending applications, Serial Nos. 143,994, filed October 25, 1926; 148,872, filed November 17, 1926 which have become Patents 1,750,782 and 1,757,132, and Serial No. 166,180 filed February 5, 1927 which has become Patent No. 1,655,431. It may also be found desirable to use the structure disclosed by my co-pending application Serial No. 159,143, filed January 5, 1927, in connection with the feeding mechanism of the present application.

The numeral 5 designates a container, which is adjustably secured on the frame, generally indicated at 6, as by screw bolts 7 extending through enlarged opening 8 and interposed shims 9. The container is preferably closed at the top by a cover 10, adjustably secured as by screw bolts 11 and interposed annular shims 12, a shaft 13 being disposed vertically in the container and rotatably supported at its lower extremity in a bearing 14, and at its upper extremity extending through the cover 10, thrust or bearing collars 15 and 16 being adjustably secured on said shaft as by screws 17 above and below said cover. The shaft 13 preferably has a suitable number of inclined feed blades 18 secured thereon which are adapted to co-operate with ribs 19 on the inner wall of the container to progressively feed the plastic material downwardly, and at the same time compact and form it into a homogeneous mass. On the upper extremity of the shaft 13 above the cover 10 a suitable bevel gear 20 is adjustably secured as by hub 21 and screw 22, said gear being adapted to mesh with a bevel gear 23, adjustably secured as by hub 24 and screw 25 on a shaft 26, Fig. 2, extending at right angles to the shaft 13. This shaft may be mounted in suitable bearings at each side of the stationary frame of the mechanism and of such length as to accommodate the number of units in operation. Plastic material may be supplied to the container 5 through chutes 27, and at one side of its lower extremity said container is formed with an outlet 28, the bottom wall of the container being inclined and extended downwardly adjacent said outlet as at 29, for a purpose which will be presently explained. On the lower extremity of the shaft 13 it is preferred to adjustably secure a plurality of scraper blades 30 and retraction blades 31, as by hubs 32 and screws 33. The blades 30 are preferably curved at their outer extremities, the back of the curved portion moving close to the sides of the container, and the blades 31 reversely curved from the lower outer corner inwardly along the lower edge, or shaped like a plow-share; so that the plastic material will slide upwardly and inwardy over the blades 31 and be pushed outwardly by the blades 30. The contour of these blades may be varied as found most advantageous in the performance of their functions.

On the shaft 26 a cam 34 is adjustably secured as by the hub 35 and screw 36, said cam having a raised part $34^a$ and a high part $34^b$, maintained in engagement with a cam roller 37, rotatably mounted on a lever 38, by a suitable tension spring 39, said spring being adjustably secured at one extremity to said lever 38 as by a hooked screw bolt 40, threaded through a bracket 41 and retained in adjusted position by a nut 42, and at its opposite extremity attached to a supporting bracket generally indicated at 43 and which is suitably secured on the container 5 by the bolts 11.

The lever 38 is preferably adjustably pivoted at one extremity on a floating block 44, shiftable in a slot 45 formed in said lever through the medium of a cranked adjusting screw 46, acting on a block 47, Fig. 11, which is pivoted to the block 44 by a pin 48, extending through said block 44 and retained in place by a cotter key 49. The supporting bracket 43 is formed with an enlarged upper portion and slotted as at 50, the block 47 being adapted to fit in said slot 50. The slot 50 is preferably formed at an inclined plane relatively to the enlarged portion of the supporting bracket 43, Fig. 12, this incline being such that when the opposite extremity of the lever 38 is in its lowermost position, the slots 45 and 50 will be parallel, for a purpose which will be hereinafter explained. The screw 46 is supported in the enlarged portion of the bracket 43 by collars 51 and projects into the slot 50 and is in threaded engagement with the block 47, as shown in Fig. 11. This structure permits adjustment of the stroke of the lever 38 while the mechanism is in operation and for a purpose which will be presently explained. The block 44 is formed with a flange $44^a$, which fits over the slot 45 and prevents lateral displacement of the bar 38, and permits sliding movement of said block in said slot 45.

The opposite extremity of the lever 38 is pivoted as at 52 to one extremity of a rod or bar 53, which extends downwardly through a guide socket 54 formed in the supporting bracket 43 and has adjustably threaded thereon a plunger 55 through the medium of a turn-buckle 56, which provides for adjustment of the altitude of reciprocation of the plunger 55 while in operation. To limit the lowermost plane of reciprocation of the plunger 55 regardless of the throw of the cam 34, I prefer to thread an abutment screw 57 in the supporting bracket 43 which may be adjusted relatively to the bar 38 while in operation. By adjusting the pivot block 44 through the medium of the screw 46, the extent of reciprocation of the plunger 55 may be adjusted while in operation without affecting its lowermost plane of reciprocation, and as the slots 45 and 50 are preferably formed so that they will be in a parallel plane when the bar 38 has reached its lowermost position, this adjustment will not affect the lowermost position of the pivot point 52.

The plunger 55 is adapted to reciprocate vertically in a profile member 58, having upper and lower chambers 59 and 60, defined by an annular rib 61, the said member 58 being secured to the container 5 as by lugs 62 and bolts 63, the lugs being formed with enlarged openings to provide for adjustment. The bottom wall 64 of the chambered profile member may be given any suitable shape and therethrough I prefer to form a plurality of feed or extrusion openings 65 and inlet openings 66.

It may be desired to extrude varying amounts of plastic material along different portions of the mold, as for instance, less at the center than at the outer peripheral portion, and the openings 65 may therefore be of varying shapes and sizes and screw threaded for removable application of screw plugs or bushings to reduce the size of the openings as at 65$^a$, thus providing selective extrusion through the bottom or side walls of the chambered profile member 58. As shown, the walls of the openings 65 are given a suitable incline in the direction of rotation of the mold, and the walls of the openings 66 an incline counter to the direction of rotation of the mold, so that extrusion of the plastic material may be aided by rotation of the mold as well as back extrusion of the excess material through the openings 66.

These openings 65 and 66 are separated by a wall or partition 66$^a$, so as to relieve the inlet openings 66 of pressure during extrusion through the openings 65. This wall may be of varying height as found most efficient in the performance of its function.

The extrusion openings are preferably arranged so that when the plastic material is extruded therethrough onto a rotating mold, the charge will assume what may be considered a spiral shaped layer as it covers the mold.

The upper chamber 59 opens directly into the container 5 at 28, and the lower chamber 60 connects with the container through a port 67, (shown closed) controlled by an automatic valve structure which will now be described.

The bottom of the container is provided with a valve supporting extension 68, in which is inserted a longitudinally slidable block 69 (Fig. 8), having a threaded bore in which is threaded the stem 70 of a valve 71. On each side of the extension 68 and sliding block 69 abutment washers 72 and 73 are mounted, through which the valve stem 70 has free sliding movement, valve springs 74 and 75 being inserted over the valve stem 70 and abutting at one end against said washers 72 and 73 and at their opposite ends against adjusting nuts 76 and 77, each adjusting nut being provided with an abutment screw 78 and 79. The smooth or unthreaded portion of the valve stem extends through the curved extension 29 of the bottom wall of the container, and to ensure against leakage, a packing gland 80 is inserted at this point. The valve 71 may be considered a two-way valve and controls the passage of plastic material from the container 5 into the chamber 60 and/or from said chamber into the container. It will be obvious that any number of these valves may be installed in co-operation with a profile in connection with a corresponding number of ports 67, or the port 67 and valve 71 made larger, as found most efficient in the operation of the mechanism.

It is preferred to operate the present feeder mechanism in timed relation with jiggering mechanism as disclosed in my copending application, Serial No. 166,180, hereinbefore noted, and by referring to said application, this structure should be readily understood and a brief description thereof should suffice. However, to provide for selective rotation of the spindles and chucks adapted to support the molds during the jiggering operation, the braking means has been slightly modified. This jiggering mechanism may be primarily driven from either of the horizontally disposed shafts 81 and 81$^a$, which are adapted to actuate vertically disposed spindles 82, which are placed coaxially and in spline-sliding engagement with hollow jigger spindles 83. The spindles 82 have secured thereon horizontally disposed friction disks or gears 84, adapted to intermittently contact with vertical, continuous-motion friction disks or gears 85, which are in spline-sliding engagement with the shafts 81 and 81$^a$ so that the friction gears 85 may be adjusted relatively to the gears 84 to vary the speed of the latter. The lower extremities of the spindles 82 project into housings 86 and are provided with saddles 86$^a$ which ride on thrust bearings supported by collars 86$^b$, removably secured on the lower end of said spindles, the saddles being pressed downwardly by springs 86$^c$, adjustably secured to the cover plates of the housings around the spindles 82, and as the saddles 86$^a$ and bearings are supported by the collars 86$^b$, the springs 86$^c$ act as an auxiliary to gravity to maintain proper intermittent frictional contact between the gears 84 and 85. The shafts 81 and 81$^a$ also have adjustably secured thereon cams 87, adapted to contact with cam rollers 88, rotatably mounted on the one extremity of levers 89, which are adjustably fulcrumed at 90 and at their opposite extremities pivoted as at 91 to pitmen 92, which are adjustably connected as at 93 to cross forks 94, adapted to fit in a necked portion of the hollow spindles 83. The hollow spindles 83 terminate in chucks 83ª, adapted to receive molds indicated by A.

Brake levers 95 are pivotally mounted on the housings 86 as at 96, said levers 95 being actuated by slide bars 97, Fig. 15, pivotally secured to the brake levers 95 as by pins 98, and prevented from lateral displacement by cotter keys or the like, said slide bars 97 being slidably supported by brackets 97ª, which may be suitably secured to or form part of the stationary frame 99 of the jiggering mechanism. Brake cams 98ª and 98ᵇ are adjustably secured, as by hubs 98ᶜ and screws 98ᵈ, on the shafts 81 and 81ª, said cams being adapted to actuate the slide bars 97 by contacting with rollers 98ᵉ and 98ᶠ, Fig. 1, rotatably mounted on opposite sides of the lower extremities of holders or fingers 98ᵍ, the upper extremities of the latter being slotted and provided with set screws 98ʰ, so that these holders with their rollers may be adjustably mounted on the bars 97 and retained in adjusted position by the set screws 98ʰ. The brake levers are adapted to raise and lower brake shoes 100, which in turn raise the disks 84 from contact with the disks 85 and also set up a braking action on the disks 84. To steady the slide bars 97 and prevent premature or sudden application of power to the spindles 82 when the brake is released, screws 98ⁱ are inserted in the brackets 97ª and adjustable to vary the resistance to free sliding movement of said bars.

When the cams 87 rotate and raise the pitmen 92, which in turn raise the spindles 83 and chucks 83ª, (the position as shown in Fig. 1), the brake cams 98ᵇ, adjustably secured on the shafts 81 and 81ª, contact with the rollers 98ᶠ and shift the slide bars 97 a sufficient distance to release the brake levers 95 from the brake shoes 100 and permit the friction disks 84 and spindles 82, which are in spline-sliding engagement with the hollow spindles 83, to lower by gravity assisted by the springs 86ᶜ, and the disks 84 will then engage the continuous-motion disks 85 and impart rotation to the spindles 82 and 83 and chucks 83ª. When the cams 87 rotate further and lower the pitmen 92 and spindles 83 and chucks 83ª, the brake cams 98ª contact with the rollers 98ᵉ and shift the slide bar 97 in the opposite direction and the brake levers 95 then raise the brake shoes 100 into contact with the friction disks 84 and also raise the latter out of contact with the continuous motion disks 85 and stop rotation of the chucks. As the brake cams 98ª and 98ᵇ are adjustable on the shafts 81 and 81ª relatively to the cams 87, the chucks and spindles may have rotation imparted thereto at any position of rise thereof, and likewise rotation may be stopped at any time, preferably during the lowering of the chucks and spindles.

It is preferred to raise the chucks and molds until the latter contact with the starting edge of the charge and then rotate the molds relatively slowly during application of the charge thereto, and to facilitate proper adjustment of the friction disks 84 and 85 to obtain this operation, it may be desirable to adapt the variable speed friction disk structure as disclosed in my co-pending application, Serial No. 143,994, filed October 25, 1926, heretofore specified, to the present jiggering mechanism.

The conveyor mechanism illustrated in connection with the present improved feeder may be readily understood by referring to my co-pending application, Serial No. 148,872. Briefly, this structure as shown comprises flexible members or chains 101, a track 102 and trays 103, having projecting trunnions 104, by which the trays are mounted relatively to the flexible members 101 so as to swing free and thus always be maintained in a horizontal plane. A step-by-step movement may be imparted to the conveyor by adjustably securing a cam 105 on the shaft 81, a lever 106 being pivoted as at 107 to a bracket 108, which may be secured to or form part of the stationary frame 99 of the lower mechanism, said lever extending upwardly and provided with a cam roller 109 adapted to move in a track 105ª formed in the cam 105. At its upper extremity the lever 106 has pivotally mounted at one side thereof an adjustable length pawl 110, said pawl normally extending at a downward incline and adjusted so that the end thereof will abut against the projecting trunnions 104, and when the cam 105 rotates and the roller 109 on the lever 106 moves in the cam track 105ª, the said lever will move forwardly and impart a step movement to the conveyor, and when the lever 106 is moved rearwardly by the further rotation of the cam 105, the pawl will ride over the projecting trunnions 104 and drop by gravity in position to again abut against the trunnion, as will be readily understood by referring to my copending application above noted. However, any suitable type of conveyor may be used, or the molds may be placed in position on the chucks and removed therefrom manually, if desired.

It is usually desirable to lubricate the charges of plastic material after extrusion into or on the molds, and to this end I show a cam 111, Fig. 2, adjustably secured as by a hub 112 and screw 113 on the shaft 26, said cam being formed with a high part 111ª. This cam may actuate either a water valve as shown in Fig. 13 or an adjustable pump as shown in Fig. 14, and generally indicated at 114, and which may be suitably secured on the bracket 43 or other part of the stationary frame of the mechanism. The valve structure in Fig. 13 comprises a plunger valve 115, slidable in a casing 116 and main chamber 116ª against the tension of a suitable compression spring 117, said chamber 116ª and casing 116 being provided with inlet and outlet pipes 118 and 119, which may be flexible members if desired, the valve 115 being adapted to seat in the inner extremity of the casing and controlling admittance of fluid to the outlet pipe 119, which leads down adjacent the profile member 58 and provided with an additional manual control valve 120. Fluid under pressure may be introduced into the chamber 116ª through the pipe 118, and when the shaft 26 is rotated, the high part 111ª of the cam 111 intermittently unseats the plunger valve 115, and admits the fluid into the pipe 119 each time the said valve unseats. This operation may be timed relatively to the feeding and jiggering operations by adjusting the cam 111 on the shaft 26.

Fig. 14 illustrates a preferred form of pump which may be used instead of the valve structure in Fig. 13 to ensure the application of a definite and measured amount of fluid to each piece of ware being manufactured. In this instance the inlet and outlet pipes are provided with any suitable form of one-way valves, as for instance the balls 121 and springs 122 retained in place in the casings 116ᵇ by perforated cover plates 123. The plunger 115ª is shouldered as at 115ᵇ, this shoulder being adapted to abut against an adjusting member in the form of a sleeve 124, which is threaded into the chamber 116ª, to provide for adjustment while in operation. By adjusting the sleeve 124, the stroke of the plunger 115ª may be varied, to in turn vary the amount of fluid forced through the outlet pipe 119 and sucked in through the inlet pipe 118 at each actuation of the plunger by the cam 111.

Figs. 3 and 4 illustrate a method of mounting a plurality of chambered profile feeding members 58 in connection with a single container 5, and also a deep mold profile feeding member in series with a flat mold profile feeding member.

The deep mold profile feeding member structure may be understood by referring to Figs. 6 and 7. In this instance the profile member 58 extends down into the mold and is partitioned by a wall 125, thus dividing the said member into two chambers, 126 and 127, the feed openings 65 being formed in the side and bottom walls of the chamber 126, and the inlet openings 66 in the side and bottom walls of the chamber 127. In Fig. 4 this deep mold profile member is shown in a position reverse to that of Fig. 6, but the structure is essentially the same.

In the event it is desired to draw any excess of plastic material back into the container, the valve structure particularly shown by Fig. 8 may be applied. However, it may be desired to convey the excess material to a separate container and re-condition it prior to again placing it in the main container 5, and in this event the structure shown in Fig. 9 may be used. In this instance, the profile member is preferably provided with a partition wall 125ª as in Fig. 6, dividing the said member into chambers 60ª and 127ª, the extrusion or feed openings 65 being formed in the bottom wall of the chamber 60ª and the inlet openings in the bottom wall of the chamber 127ª. The chamber 127ª is provided with an outlet port 67ª, controlled by a one-way valve 71ª, slidable in and supported by a detachable extension of the wall 125ª and working against the tension of a suitable spring 128, the valve stem being threaded and provided with an adjusting nut 129 and washer 130. The port 67ª leads into a conduit 131 leading to a suitable container 132, provided with baffle means 133 and a door 134. The container is preferably rendered air-tight and sub-atmosphere or suction applied thereto, and for this purpose the container is provided with an opening 135 at the top thereof, over which a nipple 136 is secured, for attachment of a flexible tube or pipe 137, which may lead to a suction pump or the like, and the degree of suction controlled by any suitable regulating means well known in structures of this type. The valve 71ª is shown unseated in the present instance, but in operation same is normally seated over the port 67ª.

In Fig. 4 the valve 71 may be applied and adjusted to function substantially as in Fig. 1 or may be adjusted to serve the purpose of the valve 71ª, Fig. 9. In this instance the chamber 127ᵇ formed by the extension 29 of the bottom wall of the container 5 is provided with a removable cover plate 29ª and a suitable threaded opening 131ª, which opens into the conduit 131 when it is desired to convey the excess plastic material to a separate container as in Fig. 9 and at which time the cover plate 29ª may be applied, and when it is desired to have the valve function as in Fig. 1, this opening 131ª may be closed as by a suitable screw plug and the cover plate 29ª removed.

To assist in confining the plastic extruded charge to the mold and also prevent the excess material from being thrown out over the sides of the molds by centrifugal force, 1 prefer to provide the profile with a retaining member or guard 58ª, shown in Fig. 16, which may be removably and adjustably secured to the profile 58 as by screws 58ᵇ extending through enlarged openings 58ᶜ.

It is preferred to drive the mechanism primarily from the shaft 81 of the jiggering mechanism, which may be provided with pulleys or the like and connect with the shaft 26 of any of the feeding units by a flexible member as at 138. The shafts 26 of the feeding units may be provided with suitable flexible couplings and pulleys and connect in series by flexible members as at 139, to enable the individual units to be driven at uniform speeds when connected in parallel or in series or in parallel and series.

In operation, plastic material may be conveyed to the container through the chute 27 and progressed downwardly by the inclined feed blades 18 co-operating with the ribs 19, the material becoming more dense and homogeneous as it nears the bottom of the container and thus eliminating any strata formations that may be present when the material is passed in through the chute. When the plastic material reaches the outlet 28, the revolving scraper blades 30 will assist in compacting it in the upper chamber 59 of the profile member 58 in the structure shown by Fig. 1. The stroke of the plunger 55 may be readily adjusted while in operation through the medium of the screw 46 and/or 57 and turn buckle 56 or by combining these adjustments, and it is preferred to adjust this plunger so that approximately the correct charge of plastic material for the particular article of ware being manufactured will be extruded onto the mold when the plunger descends. The jiggering mechanism may be adjusted and timed relatively to the stroke of the plunger 55 by adjusting the cams 87 and 98ᵃ and 98ᵇ on the shafts 81 and 81ᵃ and the pitmen 92 at 93, so as to raise and then rotate the mold while the charge is being extruded and jiggered. The cam 34 on the shafts 26 may also be adjusted to time the stroke of the plunger 55. As shown in the present instance the cams 34 rotate in a counter-clockwise direction. When the roller 37 on the levers 38 rolls off the high part 34ᵇ of the cam 34 the plunger 55 descends and extrudes the charge onto the mold at a speed and pressure depending upon the adjustment of the spring 39. As above specified, the stroke of the plunger 55 may be readily adjusted at all times, and it may be necessary to limit the reciprocation of the said plunger to the upper part of the chambered profile member 58, or the upper chamber 59 as shown by Fig 1, or lengthen the stroke of the plunger past the annular rib 61 into the lower chamber 60, or lower portion of the chambered profile member 58, or reciprocate said plunger in a limited range along any portion of said member. As the mold is being rotated during extrusion of the charge, it will be seen that the plastic material will gather on or in the mold in a layer, the thickness of which may be regulated by adjusting the space between the rotating mold and bottom wall or extreme point of the profile member 58 as by adjusting the cross forks 94 on the pitmen 92, and/or the profile member 58 on the container 5. It is preferred to adjust the cam 111 and fluid valve or pump 114 so that a spray of fluid will issue from the pipes 119 onto the charge approximately at the time the plastic material has covered the mold to the required depth of the charge, or the space between the bottom edge of the profile member and the mold when the latter reaches its highest point of elevation. The roller 37 then moves onto the cam raise 34ᵃ of the cam 34 and imparts a slight preliminary rise to the plunger 55, which serves to relieve the charge of excess pressure by slightly retracting the extruding clay from the surface of the charge, and dissipates any air pockets that may be present, and also assists in the smoothing action and prevents uneven or rough surface formations when the mold is lowered from the profile, the charge at this time being fully extruded and any excess material gathering on the bottom of the profile back of the projecting edge and in the openings 66 and 65, and when a further charge or charges are extruded, part of this excess material will be included in the charge or charges and the remainder pushed back into the profile member and container through the openings 66 by the subsequent extrusions and rotation of the mold, and also sucked back through said latter openings by reason of the vacuum in the profile member caused by the plunger 55. The roller 37 then moves onto the high part 34ᵇ of the cam 34 and the plunger rises, the displacement of the plunger body in the massed clay in the chambered profile member causing a vacuum, as just noted, which will be quickly filled by clay under pressure passing in from the container 5 through the port 67 and also by way of the outlet opening 28.

The valve 71 controlling the port 67 may be adjusted to maintain this port closed by adjusting the nuts 76 and 77 and abutment screws 78 and 79 so that the latter wil¹ abut against the washers 72 and 73, or this valve may be adjusted so as to permit varying degrees of or no plastic material to pass from the chambered profile member into the lower portion of the container, and vice versa, by relatively adjusting either or both the screws 78 and/or 79. Various other results and advantages may be secured by this valve structure and its adjustments, and no attempt is made herein to enumerate the same, it being understood that the invention is in nowise limited in this respect.

It is preferred, however, to adjust the valve 71 so that clay may pass from the lower portion of the container 5, through the port 67 into the chamber 60 of the profile member 58 when the plunger 55 rises, and thus eliminate air pockets in the chamber of the profile and provide an even density of the mass when the plunger descends and ensure even extrusion and distribution of successive charges into or on the rotating molds. It will be seen that when the plunger 55 rises, clay may also pass into the chambered profile member 58 through the outlet 28.

The cam 105 on the shaft 81 may be adjusted to impart a step-by-step movement to the conveyor when the molds are lowered onto the trays 103 in timed relation to the feeding and jiggering operation, to supply the chucks with empty molds and remove those bearing the jiggered charges to a drying room or for further operations. In Fig. 1 the molds are being moved the distance of two units at each step-by-step movement of the conveyor, and this may be increased according to the units in use and mounted in series.

By constructing the chambered profile member 58 as shown in Figs. 6, 7, 9 and 10, and applying the form of valve illustrated by Fig. 9, any excess of plastic material may be automatically conveyed to a separate container and reconditioned and again passed into the main container 5. In this instance the excess plastic material may be taken through the inlet openings 66 into the chamber 127, Fig. 6, or 127ª, Fig. 10, and through the port 67ª controlled by the valve 71ª, into the duct 131 and thence into the container 132, by means of sub-atmosphere applied through the pipe or tube 137, the baffles 133 preventing the clay and excess moisture drawn through the duct 131 from being drawn into the tube 137. The excess clay may then be periodically removed through the door 134 and re-conditioned and again placed in the container 5. The valve 71ª may be adjusted while in operation to control and regulate the application of suction or sub-atmosphere to the chamber 127, Fig. 6, or 127ª, Fig. 7, so as to withdraw the excess clay from the said chambers as it enters through the openings 66 without interfering with the efficient forming of the charge by the profile member.

In Figs. 3 and 4 the plastic material may be progressed downwardly in one main container 5 and supply a plurality of chambered profile feeding members. If it is desired to convey the excess of plastic material to a separate container and recondition the same as in Fig. 9, the cover plate 29ª may be applied as shown and sub-atmosphere pressure applied to the chamber 127ᵇ through the opening 131ª, as heretofore specified. The adjusting nut 76 and abutment screw 78 may then be adjusted so that the latter abuts against the washer 72, thus enabling the valve 71 to function in a manner substantially similar to the valve 71ª, Fig. 9. However, as heretofore explained, this valve may be adjusted to permit flow, under control, of plastic material in either or both directions.

If it is desired to operate the mechanism in a manner substantially as described in connection with Fig. 1, the cover plate 29ª may be removed and the opening 131ª closed by a suitable screw plug. The valve 71 may then be adjusted to function substantially as specified in connection with the structure disclosed by Fig. 1.

The lower scraper blades 31 prevent the plastic material from gathering on the bottom of the container 5 and tend to create a suction or sub-atmospheric condition at the upper portion of the chamber formed by the bottom extension 29 of the container as shown in Fig. 1 and prevent the clay from accumulating under pressure in this chamber and interfering with the proper functioning of the valve 71, the material sliding upwardly and inwardly over the blades 31 and being pushed outwardly by the blades 30 into the profile member 58 through the outlet 28. The inclination or plow-share-like shape given to these blades may be increased or decreased, and it also may be necessary to extend said blades outwardly over the chamber or pocket formed by the said extension 29 or retract the same, it being understood that the invention is not restricted to the particular formation of the blades 30 and 31.

In some instances it may be found desirable in the structure disclosed by Fig. 1 to feed the molds by combining extrusion and extraction, through rotation of the feed blades and proper adjustment of the valve 71 in co-operation with the rotation of the molds. The cam 34 may be disconnected from the shaft 26 so that the plunger 55 will remain stationary, said plunger then being adjusted by the turn buckle 56 and screw 46 to lower in the chambered profile member to a point adjacent the annular rib 61, or so that the upper chamber 59 may be closed off from the main container 5 and clay will be prevented from passing into the profile member through the outlet 28. The inlet openings 66 may then be plugged or closed. The feed blades 18 in the main container 5 may then be rotated and the chamber 60 filled through the port 67 by pushing inwardly on the valve 71 to clear said port. The valve 71 may then be permitted to retract into the port 67 and the nut 76 adjusted to adjust the valve 71 relatively to the pressure on each side of the port 67 to permit the plastic material in the chamber 60 to extrude very slowly through the holes 65. The mold is then adjusted so that at its highest point of rise, the space between the mold and bottom edge of the profile member 58 will be equal to the thickness of the desired charge. It is preferred to at first slowly rotate the mold and gradually increase its speed of rotation, and as the mold is raised and contacts with the material slowly extruding from the holes 65, the said material will adhere to the mold, and due to cohesion inherent in material of a plastic nature, a pulling action or extraction of the charge will ensue when the mold is rotated, which may be likened to the placing of the tip or edge of a wet sheet of paper on a smooth rotating surface. From the time the clay first contacts with and is pulled by the mold, extrusion is replaced by extraction. The issuing charge is then severed and extraction stopped by the layer of clay on the mold thickening beyond the predetermined thickness of the charge,—which may be when the first layer is completed and doubles on its starting edge,—and encountering the edge of the profile. Extrusion then replaces extraction, and the excess clay banking in rear of the edge of the profile and over the openings 65 then stops extrusion by exerting a back pressure on the material in the chamber 60. Lubricant is then applied and the speed of rotation of the mold increased, the lubricant tending to decrease adhesion between the protruding stub or bank of clay and top surface of the rotating charge and producing a semi-liquid film of clay on the surface as the profile smooths and forms the charge. The mold may then be lowered onto the tray, and as the mold is lowered, extrusion is again resumed, due to release of back pressure on the material in the chamber 60 and tends to bulge the banked up mass adhering to the bottom of the profile, so that when the succeeding mold is elevated, it will contact with the bulged surface and automatically repeat the foregoing series of operations.

Figs. 17 and 18 illustrate a manner of constructing the improved feeder mechanism to adapt it for manual operation. In this instance the container 5 is shown disposed horizontally and adjustably secured on a supporting bracket 140 as by screw bolts 7ª passed through enlarged openings 8ª in said bracket. The bracket 140 is adjustably pivoted or hinged as at 141 to the frame 6ª, the latter being formed with a number of pivot holes 141ª to provide for vertical adjustment. The chambered profile member 58 may be adjustably secured, as in Fig. 1, to the container over the outlet 28 and provided with a handle 142. A spring 143 is interposed between the bracket 140 and frame 6ª and seated in a socket plate 144, the latter being mounted on an adjustment screw 145, provided with a lock nut 146, and extending through the frame 6ª. This spring 143 may be adjusted to maintain the container in normal position, the container being depressed against the tension of said spring, and to limit and adjust and maintain constant the lowermost plane of depression of the container and profile as well as the highest point of rise; a threaded rod 147 may be hinged or pivoted on the bracket 140 as at 148, and adapted to have free vertical movement through the frame 6ª, adjusting nuts 149 and 150, and lock nuts 151 and 152 being applied on said rod above and below the frame 6ª. The nut 149 may be adjusted on the rod 147 to limit and maintain constant the lowermost plane of depression of the container and profile, and the nut 150 may be adjusted to limit the highest point of rise of the container and profile. The feed blades 18 and ribs 19 may be constructed and applied to the shaft 13 as in Fig. 1.

The profile member 58 is shown in this instance disposed in a position opposite to the profiles in Fig. 1, it being customary in the manual operation of profiles to apply them to the mold in this manner, and for the purposes of illustration the valve 71 is shown in section and side elevation instead of end elevation, as would be the case if the valve were applied as in Fig. 1. However, the profile member and valve may be arranged as found most advantageous in the operation of the feeding mechanism. The excess material passes into the chamber $127^e$ as in the preceding structure and thence through the passageway $127^f$ and either one or both inlet openings $127^c$ and $127^d$ and into the container 5, the scraper blades 30 and retraction blades 31 being disposed on the shaft 13 over the opening $127^c$, to maintain a clear space or air pocket around this opening and set up a suction effect in the passageway $127^f$ and chamber $127^e$, and relieve the valve 71 of pressure, and the longitudinal disposition of the container in this instance will also relieve the passageway and chamber of head pressure. The inlet openings $127^c$ and $127^d$ are adapted to be closed by slides, not shown, the walls of these openings being V-shaped for this purpose. Ordinarily the opening $127^c$ may remain clear and the opening $127^d$ closed, but it may be desired to reverse the order and depend solely on pressure exerted by the incoming excess material and free flow, due to the longitudinal disposition of the container, of the excess material back into the container through the inlet $127^d$.

The plunger 55 in this instance is pivotally mounted as at 153 on a lever 154, having a handle portion 155 at one extremity and at its opposite extremity hinged or pivotally mounted as at 156 in a bifurcated bracket extension 157, which may be formed integral with or attached to the container 5. The plunger is depressed against the tension of of a spring 158, interposed between the lever 154 and container 5 and seated in the latter and adjustable through the medium of a screw 159.

To adjust the lowermost point of depression of the plunger and provide for extruding measured charges through the chambered profile member, the lever 154 is provided with a screw 57ª, and to adjust the highest point of rise of said plunger, a screw 160 is inserted in the bracket 157 and adjustable relatively to an extension 161 of the lever 154. By adjusting screws 57ª and 160 relatively to one another, the extent of reciprocation of the plunger 55 may be varied, or the said plunger may be held stationary in any part of the chambered profile 58.

The shaft 13 with its blades may have rotation imparted thereto by ratchets, shown in detail by Fig. 18, or continuously driven by a motor. However, it is preferred to use the ratchet structure. Ratchet bars 162 and 163 are pivotally mounted, as at 164, on the frame 6ª and extend upwardly on each side of a gear 20ª, adjustably secured on the shaft 13 as by a hub 21ª and screw 22ª, the ratchet bars 162 and 163 being pressed into contact with the gear 20ª by means of springs 165 and 166, secured at one extremity to the said bars and at their opposite extremities adjustably secured to the frame 6ª as at 167. The teeth of these ratchet bars are oppositely inclined, and either one or both of the bars may be used, or the shaft 13 may have rotation imparted thereto during both the raising and lowering movements of the container, or during either the lowering or raising movement. The shaft 13 may also be provided with a gear 168, which may be applied when it is desired to continuously drive the shaft 13 by the motor 169, said gear being adapted to mesh with a pinion 170 on the motor shaft. The gear 168 and pinion 170 should be of such relative size as to give the required driving speed to the shaft 13, and likewise, when using the ratchet structure, the rotation of the shaft 13 may be adjusted by adjusting the nuts 149 and 150 and also by substituting larger or smaller gears for the gear 20ª.

The jiggering mechanism in this instance may be operated manually to impart rotation to the mold by depressing a foot lever 171, fulcrumed at one extremity as at 172 on a bracket 173, which may form part of or be attached to the stationary frame 6ª of the mechanism. The lever 171 is adapted to actuate a pitman 174, pivoted to said lever at 175, said rod extending vertically through the bracket 173 and frame 6ª and at its upper end normally abutting against the brake shoe 100, the latter in turn normally maintaining the friction disk 84, fast on the spindle 82, in elevated position out of contact with the continuous-motion disk 85, the lower extremity of the spindle 82 extending into the housing 86 as in the preceding structure, the pitman being depressed against the tension of a spring 176, mounted on the pitman and interposed between the bracket 173 and a collar 177, fast on said pitman and adjustable to vary the tension of the spring 176 through the medium of a set screw 178. The pitman may also be limited in its vertical movement by the collar 177. The hollow spindle 83, which is in spline-sliding engagement with the spindle 82 and terminates in the chuck 83ª, is rotatably supported on the frame 6ª by a bearing collar 179, adjustably secured as by a screw 180, to permit vertical adjustment of the chuck as may be desired during the jiggering operation.

In operation, the mixed plastic material may be fed to the container 5 through the chute or hopper 27 and progressed through the container into the profile member as in the preceding structure, the shaft 13 being intermittently actuated by the ratchet mechanism during the raising and lowering movements of the container, or during either the raising or lowering movements or any part thereof, or continuously driven by the motor 169. The depth of the charge may be varied by adjusting the screw 149 to limit the depression of the profile relatively to the mold, or by adjusting the chuck and mold relatively to the profile by the screw 180, or the profile and mold may be adjusted relatively to one another. The profile and container may first be depressed and extrusion initiated by depressing the plunger 55 until the starting edge of the charge contacts with the mold, which may at this time be rotated at a gradually accelerated speed by depressing the foot lever 171, the charge being fully extruded by depressing the plunger to a point permitted by the screw 57ª, which may be adjusted to vary the size of the charge. The valve 71 functions as in the preceding structure. By relative adjustment of the springs 143 and 158 to make the resistance to depression of the container and profile less than that of the plunger, the complete feeder structure may be depressed by the lever 154 until the profile reaches its lowest adjusted position, the plunger then being depressed in the profile member. The plunger may also be maintained stationary in the profile 58 by adjusting the screws 57ª and 160 and the complete structure depressed by the handle 142, the charge then being measured by adjusting the nuts 149 and 150, to vary the range of vertical movement of the container and gear 20ª relatively to the ratchet bars 162 and 163, or substituting varying sized gears for the gear 20ª.

If it is desired to extrude and extract the charges, the motor may be connected to drive the shaft 13 continuously and the plunger lowered in the profile member and adjusted stationary relatively to the opening 28 to permit just enough pressure to be exerted on the material in the profile member to slowly extrude, and the valve 71 then adjusted to regulate this pressure, the extraction and extrusion process then ensuing as in the preceding structure.

Lubrication may be applied manually as ordinarily practiced, as by means of a sponge, and likewise the molds may be applied to and removed from the chucks manually. Clay may be conveyed to the container through the chute 27 without stopping operation of the machine, and one of the advantages of the foregoing manually operated structure is that it dispenses with the services of the usual batter-out or preformer in the manufacture of pottery as ordinarily practiced.

It will be understood that no attempt has been made herein to enumerate all the advantageous operations that may be practiced with the improved feeder mechanism nor the variations in structure that may be adopted within the scope of the invention as set forth in the appended claims. The chambered profile member 58 may be varied in accordance with the article of pottery being manufactured, and in some instances it may be of advantage to detach this member and adapt it for use without the main container, or feed the clay directly into the profile member.

What is claimed as new is:—

1. In mechanism of the class specified, means for progressing a mass of plastic material into a profile member adapted to temporarily retain a portion of the mass, and a reciprocating member for extruding the material in charges through the walls of said profile member.

2. In mechanism of the class specified, means for progressing a mass of plastic-material into a profile member adapted to temporarily retain a portion of the mass, and a reciprocating means for extruding the material in measured charges through, and forming said charges by the walls of said member.

3. In mechanism of the class specified, means for progressing plastic material through a main container into a chambered profile member, a reciprocating means for extruding the material in measured charges through the walls of said member into or on a mold, and means for forming the charges by rotation of the mold.

4. In mechanism of the class specified, means for progressing plastic material through a main container into a chambered profile member, and an automatically intermittently operating means for extruding the material in measured charges through the walls of said member into or on a mold, the charge being formed by said member through rotation of the mold.

5. In mechanism of the class specified, a chambered profile adapted to receive plastic material, means for extruding the said material through the wall of said profile into or on a mold in measured charges and simultaneously forming said charges by the wall of the profile through rotation of the mold, and means for withdrawing excess material of the charges through the wall of the profile.

6. In mechanism of the class specified, a chambered profile adapted to contain plastic material, means for progressing plastic material into the profile, a reciprocating member for extruding said material through openings in the bottom wall thereof onto a mold in measured charges, the charges being formed by said profile through rotation of the mold, and means for adjusting said openings.

7. In mechanism of the class specified, a chambered profile member, means for progressing plastic material into the chamber of said profile member, means for extruding the plastic material through a plurality of openings formed in the wall of the profile member onto a mold, and means for automatically controlling the density of the mass of material in said chamber.

8. In mechanism of the class specified, a chambered profile member, means for progressing plastic material into the chamber of the profile member, means for forcing extrusion of the plastic material through the walls of the profile member into or on a mold in predetermined charges, and means for removing excess material of the charges.

9. In mechanism of the class specified, a container for plastic material, a chambered profile member attached to and communicating with the container, means for progressing the plastic material through said container into said profile member, means operable in the chamber of the profile member for extruding said material in measured charges through said profile member onto a mold, and means for rotating the mold to preform and finally form the charge by the said profile member.

10. In mechanism of the class specified, a container for plastic material having an outlet opening, a chambered profile member adjustably secured to said container over the outlet and having extrusion openings and excess material-receiving openings, means for progressing the plastic material through the container into the chambered profile member, means for forcing the material through the extrusion openings in predetermined charges onto or in a mold, and means for removing the excess material of the charges through the said receiving openings.

11. In mechanism of the class specified, a container for plastic material having an outlet opening, a chambered profile member adjustably secured to said container over said outlet and provided with extrusion openings and excess material-receiving openings, means for progressing the plastic material through the container into the chambered profile member, adjustable plunger means adapted to reciprocate in said profile member, said profile member being also provided with a port opening into the container, and means for automatically regulating the passage of plastic material through said port.

12. In mechanism of the class specified, a container for plastic material having an outlet, a profile member adjustably secured to said container and provided with upper and lower chambers and extrusion and excess material-receiving openings, the upper chamber of said profile member registering with said outlet and the lower chamber provided with partition means and a port, means for progressing the plastic material through the container into the upper chamber of the profile member, a plunger adapted to reciprocate in the chambers of said profile member, and means for automatically controlling the density of the mass of material in the chambers of the profile member.

13. In mechanism of the class specified, a container for plastic material having an outlet, a profile member removably and adjustably secured to the container and provided with upper and lower chambers and extrusion openings and excess material-receiving openings, the upper chamber of said profile member registering with said outlet and the lower chamber provided with a partition and a port opening into the lower portion of said container, a plunger adapted to reciprocate in the chambers of said profile member, a valve for said port, and means for adjusting said valve to regulate the passage of plastic material through said port.

14. In mechanism of the class specified, a container for plastic material having an outlet, a profile member removably and adjustably secured to said container and divided into separate chambers and provided with extrusion openings and excess material-receiving openings, feed blades, scraper blades and retraction blades in said container and operable to progress the material toward the bottom and through the outlet of the container into the profile member and retract the material from the bottom of the container, a plunger adapted to reciprocate in said profile member, means for adjusting the altitude of reciprocation of said plunger, while in operation, and means for withdrawing excess material through one of the chambers of the profile member.

15. In mechanism of the class specified, a main container for plastic material having outlets and bottom extensions, a plurality of profile members removably and adjustably secured to said container over the outlets and divided into extrusion and excess material chambers and provided with extrusion openings and excess material-receiving openings, feed blades and scraper blades in said container adapted to progress the plastic material through the container and into the profile member, and retraction blades adapted to reverse the direction of movement of said material, plungers adapted to reciprocate in said profile members, means for adjusting, while in operation, the extent of reciprocation of said plungers, and valve means for controlling the withdrawal of excess material through the openings and chambers provided therefor.

16. A machine for the manufacture of pottery, comprising, in combination, a container for plastic material, a chambered profile member, means for progressing the plastic material through said container into said profile member, a conveyor for molds, jiggering mechanism adapted to raise and rotate and lower said molds, and means for extruding the plastic material through the wall of said profile member onto the molds and forming the charge by rotating said molds.

17. A machine for the manufacture of pottery, comprising, in combination, a container for plastic material having an outlet, a chambered profile member secured to said container over the outlet and provided with extrusion openings and excess material-receiving openings, means in said container for progressing the plastic material through said outlet into the chambered profile member, a conveyor for molds, jiggering mechanism adapted to raise and rotate and lower the molds, a plunger adapted to reciprocate in said profile member, and means for adjusting the reciprocation of said plunger, while in operation, to extrude measured charges onto the molds, the charges being spread and formed by the profile member through rotation of the molds.

18. A machine for the manufacture of pottery comprising, in combination, a container for platsic material having an outlet, a profile member removably and adjustably secured to said container and having upper and lower chambers defined by a guide rib and a port opening into said container, means for progressing the plastic material through said container into the upper chamber of the profile member, mold conveying means and jiggering mechanism operable to raise and rotate and lower the molds and impart a step-by-step movement to the conveying means, a plunger adapted to reciprocate in said profile member to extrude measured charges onto the molds to be formed by the rotation of the latter, and valve means controlling the said port for maintaining an even density of the mass of material in said profile member.

19. A machine for the manufacture of pottery comprising, in combination, a main container for plastic material and a plurality of chambered profile members, said latter members being provided with extrusion openings and excess material openings, means in said main container for progressing the plastic material therethrough and into the chambered profile members, mold conveying means and jiggering mechanism adapted to raise and rotate and lower the molds, means for imparting a step-by-step movement to the conveyor, and vertically reciprocable plungers adapted to extrude measured charges onto the molds in timed relation to the jiggering mechanism to be formed by the rotation of the molds, the jiggering mechanism being adjustable relatively to the profile members to vary the thickness of the charge.

20. The combination as claimed in claim 19, wherein the rotation of the molds also progresses part of the excess material into the openings provided therefor, and the reciprocation of the plunger draws said material back into the profile members.

21. A machine for the manufacture of pottery comprising, in combination, a main container for plastic material and a container for excess material, a plurality of chambered profile members adjustably secured to the main container and provided with extrusion openings and excess material-receiving openings and ports, means in said main container for progressing the plastic material therethrough and into the chambered profile members, mold conveying means and jiggering mechanism adapted to rotate the molds, conduits connecting said ports with said container for excess material, a plunger adapted to reciprocate in said profile member in timed relation to the jiggering mechanism to extrude measured charges into or on the molds, and means for withdrawing excess material from the charges through said ports to the container adapted therefor.

22. A machine for the manufacture of pottery comprising, in combination, a main container for plastic material and a container for excess material, a plurality of chambered profile members adjustably secured to said main container and provided with ports and extrusion openings and excess material-receiving openings, means in said main container for progressing the plastic material toward the bottom of the container and into the chambered profile members, mold conveying means and jiggering mechanism adapted to rotate the molds, a conduit connecting said ports with said container for excess material, plungers adapted to reciprocate in said profile members in timed relation to the jiggering mechanism to extrude measured charges into or on the molds, and means for withdrawing excess material through said openings and ports to the container therefor through the application of sub-atmosphere and rotation of the molds.

23. The combination as set forth in claim 22, wherein the ports are provided with valves to regulate the withdrawal of excess material.

24. A machine for the manufacture of pottery comprising, in combination, a main container for plastic material and a container for excess material adapted to have suction means applied thereto, a plurality of chambered profile members adjustably secured to said main container and provided with ports and extrusion openings and excess material-receiving openings, means in said main container for progressing the plastic material therethrough, and means for retracting the material from the bottom of said container, and an adjustable lubricant applying means, mold conveying and jiggering mechanism adapted to rotate the molds, plungers adapted to reciprocate in said profile members in timed relation to the jiggering mechanism, conduits connecting said ports with the container for excess material, and automatic valves adapted to control said ports and adjustable to permit return of part of the excess material to the main container or removal of all excess material to the container adapted therefor.

25. A profile for use in the manufacture of pottery provided with a partitioned chamber for plastic material and means for applying the plastic material to a mold.

26. A profile for use in the manufacture of pottery provided with a main chamber for plastic material and a chamber for excess material and means for applying the material in said main chamber to a mold in charges and simultaneously forming the charges.

27. A chambered profile member provided with means for applying a charge of plastic material onto a mold in the form of a spiral layer and forming the charge by rotation of the mold.

28. In combination, a chambered profile member provided with extrusion openings and excess material-receiving openings, and a plunger adapted to reciprocate in said profile member to extrude measured charges of plastic material.

29. In a machine for the manufacture of pottery, a profile formed with a main chamber for plastic material and a chamber for excess material, respectively provided with selective extrusion openings and excess material-receiving openings.

30. In a machine for the manufacture of pottery, means for removing excess material, comprising an inlet chamber having a port, a container, a conduit leading from said port to said container, and a valve controlling said port.

31. In a machine for the manufacture of pottery, means for removing excess material, comprising an inlet chamber provided with inlet openings and a port, a container adapted for application of sub-atmosphere, a conduit leading from said port to said container, and a valve for regulating the application of sub-atmosphere and passage of excess material through said port.

32. In a machine for the manufacture of pottery, the combination with a profile member having an extrusion chamber and excess material-receiving chamber provided with a port, of a container provided with means for the application of suction and baffles, a conduit connecting said excess material-receiving chamber with said container, and a valve controlling said port to automatically regulate the application of suction to said last named chamber and the withdrawal of excess material through said port.

33. In a machine for the manufacture of pottery, a main container and chambered profile member, the bottom wall of said container being provided with an extension forming a chamber, said profile member having a port opening into said chamber, and a valve adjustable to maintain a predetermined pressure in said last-named chamber and the chamber of the profile member.

34. In a machine for the manufacture of pottery, a main container and chambered profile member, the bottom wall of said container being provided with an extension forming a chamber, said profile member having a port opening into said chamber, and a valve adjustable to maintain a predetermined pressure in said last-named chamber, and the chamber of the profile member, said valve having a stem adjustably threaded in a sliding block supported by said extension, annular members on each side of the extension and block, through which the stem is freely slidable, tension springs on each side of said annular members, and adjusting nuts and abutment screws for adjusting the valve in said port to maintain the desired pressure in each of said chambers.

35. In a machine for the manufacture of pottery, in combination, a container for plastic material provided with a bottom extension, a chambered profile member adjustably secured to said container and also forming a chamber in the lower extremity of the container when applied thereto, said profile member being provided with extrusion openings and a port opening into the chamber of the container, means in said container for progressing the plastic material into the lower container chamber, a mold conveyor and jiggering mechanism adapted to raise and rotate and lower the molds, adjustable fluid-applying means, and means for controlling the passage of plastic material from said container into the profile member, the material being first extruded, then extracted and segregated in charges and formed by rotation of the mold and application of fluid.

36. In a machine of the class specified, a horizontally disposed container pivotally mounted at one extremity and having an outlet at its opposite extremity and selectively closeable side ports, a chambered profile member adjustably secured to the container over the outlet and provided with a handle and selective extrusion openings and excess-material-receiving openings and a port, means for progressing plastic material through the container and into the profile member and automatically operable through the normal operation of the machine, a manually operable charge-extruding member disposed in the profile member, means for adjusting said member to vary the charge, and valve means disposed to control the port of the profile member and adjustable to permit the flow of a predetermined volume of plastic material therethrough in either direction.

37. In a machine of the class specified, a horizontally disposed container pivotally mounted at one extremity and having an outlet at its opposite extremity and selectively closeable side inlet ports, a chambered profile member adjustably secured to the container over the outlet and provided with a handle and selective extrusion openings and excess-material-receiving openings and a port opening into a passage leading to the side inlet ports of the container, means in said container for progressing plastic material therethrough and into the profile member and means for maintaining an air pocket in the container over the open side inlet port to set up a suction in said passage, a manually operable plunger disposed in said profile member, and valve means disposed to control the port of the profile member and adjustable to automatically regulate the flow of plastic material therethrough in either one or both directions.

38. In combination, a manually depressible container and chambered profile member, means for progressing plastic material through the container and into the profile member, said container being provided with a side passageway leading into selectively closeable inlet ports and said profile member having extrusion openings and plastic-material-receiving openings and a port opening into the said passageway, means in said container for maintaining an air pocket over the open inlet port, a manually depressible charge-extruding plunger in said profile member, valve means disposed to control the port of the profile member and adjustable to automatically regulate the flow of plastic material therethrough in either or both directions, and manually operable jiggering mechanism for imparting rotation to the molds.

39. The combination as claimed in claim 38, wherein the plunger is adjustable in the profile member relatively to the means for progressing plastic material through the container, and the valve adjustable relatively to the pressure in the profile member to provide for extrusion by pressure and extraction by rotation of the mold.

40. In a machine for feeding plastic material to molds in the manufacture of pottery ware, a reciprocable extruding member, means for reciprocating said member, and a means for adjusting, while in operation and while the driving connection subsists, the extent of reciprocation of said member.

41. In a machine for feeding plastic material to molds in the manufacture of pottery ware, a reciprocable extruding member, means for reciprocating said member, and a means for adjusting, while in operation and while the driving connection subsists, the limit of travel of said member in one direction without varying the limit of travel thereof in the opposite direction.

42. In mechanism of the class specified, in combination, a profile, a mold, a reciprocable and rotatable chuck, means including intermittingly contacting friction gears for reciprocating and intermittently rotating said chuck to effect a cooperative relationship between the profile and mold, and adjustable rotary cams operating to effect contact of said gears to thereby initiate the period of rotation of said chuck during any point of reciprocation thereof.

43. In mechanism of the class specified, in combination, a profile, a mold, a reciprocable and rotatable chuck, means including intermittently contacting friction gears for reciprocating and intermittently rotating said chuck to effect a cooperative relationship between the profile and mold, and adjustable rotary cams operating to move said gears out of contact to thereby stop rotation of said chuck during any point of reciprocation thereof.

44. In mechanism of the class specified, in combination, a profile, a mold and chuck, means for reciprocating said chuck, coacting intermittently contacting friction gears for rotating said chuck, and adjustable rotary cams for effecting contact and release of said gears during any period of reciprocation of said chuck.

45. In a machine of the class specified, in combination, a profile and mold, means for feeding a charge of plastic material to said mold, means for rotating said mold in operative adjacency to said profile to form the charge, and a means for automatically applying a measured quantity of a fluid medium to the charge.

46. In a machine of the class specified, in combination, a profile and mold, means for feeding a charge of plastic material to said mold, means for rotating said mold in operative adjacency to said profile to form the charge, and a means for automatically applying a fluid medium to the charge during formation thereof, said means being adjustable to measure the quantity of fluid applied to the charge.

47. In a machine of the class specified, in combination, a profile and mold, means for feeding a charge of plastic material to said mold, means for rotating said mold adjacent said profile to form the charge, and a guard member, stationarily mounted relatively to the mold, for limiting the radial spread of the charge beyond the forming surface area of the mold, said member diverging at one extremity from the normal curvature of the mold.

48. A manually operative machine for feeding plastic material to molds, comprising in combination a container pivotally mounted at one extremity and having a chambered profile secured to the opposite extremity thereof adapted to be lowered into operative position relatively to the molds, means in said container for progressing the plastic material through said container into said profile, a reciprocable member for extruding the plastic material onto the molds, the lowering of the profile into operative position simultaneously actuating said progressing means and said reciprocable member.

Signed by me this 11th day of March, 1927.

WILLIAM J. MILLER.